United States Patent Office 3,183,276
Patented May 11, 1965

3,183,276
PROCESS FOR THE PRODUCTION OF FLUORINATED ORGANIC COMPOUNDS
Martino Vecchio, Milan, Italy, assignor, by mesne assignments, to Edison, Milan, Italy, a corporation of Italy
No Drawing. Filed Feb. 28, 1961, Ser. No. 92,142
Claims priority, application Italy, Mar. 16, 1960, 4,571/60, Patent 628,607; May 25, 1960, 9,365/60, Patent 630,920
14 Claims. (Cl. 260—653.4)

The present invention relates to a continuous process for the production of fluorinated organic compounds from aliphatic organic compounds, using gaseous hydrofluoric acid and a particularly effective catalyst.

It is well known that fluorinated organic compounds are preferably produced in a continuous process by means of fluorination in the liquid phase which is generally effected by the reflux boiling under pressure of a mixture of hydrofluoric acid, an halogenated organic substance and chlorine in the presence of a catalyst consisting of halides of antimony.

Other processes used for the production of fluorinated organic compounds take place in the vapor phase and consist in passing a mixture of an organic substance and hydrofluoric acid, which may or may not contain chlorine, over catalysts which are generally based on fluorides of aluminum, chromium, cobalt, zirconium, etc.

It is possible, according to some researchers, by means of fluorinating saturated and unsaturated aliphatic haloderivatives over aluminum fluoride, to obtain products in which the halogen atoms linked to carbon atoms are more or less completely replaced by fluorine atoms but without any of the hydrogen atoms directly linked to carbon being replaced.

Thus it is known that by fluorinating trichloroethylene with hydrofluoric acid, with or without the presence of chlorine, over such well-known catalysts as chromium and aluminum fluorides, 1,1,1-trifluoro-2-chloroethane is obtained by a mechanism which includes the partial substitution for chlorine atoms linked to carbon atoms, of fluorine atoms in such a way, however, as to bring about an increase in the number of hydrogen atoms in the molecule.

If zirconium fluoride is used as a catalyst and fluorinating carried out with hydrofluoric acid and chlorine, products are obtained by a mechanism which consists of the saturation of the double links by fluorine atoms, with or without partial substitution for the halogen atoms linked to carbon atoms, of fluorine atoms.

With this type of process also, there are no cases of hydrogen atoms being replaced by fluorine atoms.

It is well known that highly fluorinated compounds are in exceptionally keen demand in industry and trade on account of their particularly valuable properties.

In the prior art these highly fluorinated compounds were obtained from highly halogenated compounds of the perhalogen type which had no hydrogen atoms linked to carbon atoms.

A main object of the present invention is therefore to provide an improved process for fluorinating saturated and unsaturated aliphatic halo-derivatives in the vapor phase, with hydrofluoric acid, with or without the presence of chlorine—a process which has distinct advantages in that it replaces more or less completely the halogen atoms linked to carbon atoms in the aliphatic reagent compound, with fluorine atoms.

Another object of the present invention is to provide an improved process for fluorinating saturated or unsaturated aliphatic halo-derivatives in the vapor phase, with hydrofluoric acid and chlorine—a process which has distinct advantages in that it brings about, in a single-stage reaction, the substantially complete replacement of the halogen atoms originally present in the aliphatic reagent compound, with fluorine atoms, and at the same time the replacement of the hydrogen atoms originally linked to carbon atoms, with fluorine atoms.

Another object of the present invention is to make it possible to obtain highly fluorinated compounds (which, as stated, were heretofore obtainable only from highly halogenated compounds of the perhalogen type, i.e. devoid of hydrogen atoms linked to carbon atoms), also from compounds which are only partially halogenated and which contain hydrogen atoms linked to carbon.

A further object is to provide a catalyst which will promote the reactions in the process according to the invention.

It has now been found according to the invention that thorium fluoride whether used alone or on an inert support such as carbon or mixed with fluorides containing basic fluorides or oxides of metals such as chromium, aluminum and thorium, is a very active catalyst in promoting fluorination reaction with hydrofluoric acid. It was thus discovered that, by passing a mixture of a halogenated organic compound (especially one and two carbon chlorinated alkanes and alkenes) and hydrofluoric acid in vapor phase over a catalyst containing thorium fluoride, products are obtained in which there is a substantially complete replacement by fluorine of the halogen atoms which are linked to carbon atoms.

It was furthermore observed that the passage of a vapor phase mixture of chlorine, hydrofluoric acid and a halogenated derivative of saturated or unsaturated hydrocarbons, over a catalyst containing thorium fluoride, yields products in which there is a substantially complete substitution of fluorine atoms for the halogen atoms, at the same time, a complete substitution of fluorine atoms for the hydrogen atoms originally linked to carbon atoms.

The objects listed hereinabove and other objects which will appear from the description which follows, are attained by means of the fluorination process according to the present invention, which consists of passing a mixture of hydrofluoric acid, a saturated or unsaturated chlorine derivative of hydrocarbons, possibly chlorine and preferably an inert gas such as nitrogen, over a fixed, movable or fluid bed of a catalyst which contains essentially thorium fluoride.

The process may be carried out between 100° and 500° C. and preferably between 200° and 450° C.

The pressure, which is approximately equal to atmospheric pressure, is in practice determined by the loss of pressure head along the apparatus of the processing plant. If the organic substance is not gaseous at room temperature, it is evaporated in an appropriate container heated to a temperature between 60° and 300° C. according to the boiling point and thermal stability of the substance in question.

It has been found, still according to the invention, that when chlorine is used, it is important to mix this reagent with hydrofluoric acid before mixing it with the organic substance in order to prevent the formation of chlorine derivatives which would reduce the yields of the desired fluorine derivatives. The molar ratio between the chlorine and the hydrofluoric acid may preferably be less than 4; whilst the molar ratio between the hydrofluoric acid and the substance to be fluorinated may be equal to or greater than 1 depending on the number of atoms of fluorine which it is intended to introduce into the organic molecule.

The time during which the reagents are in contact on the catalyst may vary widely but it should be borne in mind that an increase in the contact time generally leads to the formation of more highly fluorinated compounds.

Thorium fluoride as a catalyst may be prepared in various ways, for example by dissolving in water a soluble salt of thorium such as thorium nitrate or thorium chloride and then precipitating the fluoride from the solution with hydrofluoric acid which may be either anhydrous or in solution, or else by fluorinating a salt of thorium such as thorium chloride with hydrofluoric acid gas. If the thorium fluoride is used with a mixture of fluorides and basic fluorides or fluorides and oxides of such metals as aluminum, chromium and thorium, it is better to dissolve a thorium salt in water together with a chromium or aluminum salt and then precipitate the corresponding hydrates with a base and treat such hydrates with an appropriate quantity of hydrofluoric acid.

According to another method, the catalyst in question may be obtained by impregnating an oxide containing possibly a hydroxide or a fluoride comprising possibly either a basic fluoride (i.e. oxyfluoride) or an oxide of such metals as aluminum and chromium, with a solution of a thorium salt. After absorption, the catalyst is dried by heating at 120°–150° C. and is then activated by re-heating it in a light current of air at a temperature lower than 600° C. and preferably between 350° and 550° C. and treating it with gaseous hydrofluoric acid at a temperature lower than 500° C. and preferably within the range 150° to 350° C.

If, after several hours of processing, the catalyst should show any slackening of activity, it is easily re-activated simply by heating it at a temperature lower than 600° C. in a light current of air or air and steam.

In order to illustrate the process according to the present invention, there are disclosed herebelow some examples of fluorination which are not intended to limit the scope of the present invention but merely have the object of demonstrating more clearly the catalytic activity of thorium fluoride.

*Example No. 1*

1,778 g. of active granulated alumina were impregnated with a solution containing 174.6 g. of $ThCl_4 \cdot H_2O$ and 640 g. of distilled water. The product prepared in this way was heated at 120° C. for 24 hours and then at 550° C. for two hours, in a light current of air (0.3 litre per hour), and was then treated with gaseous hydrofluoric acid at a temperature within the range 150° to 350° C. until complete saturation was reached. Over the catalyst thus prepared there was passed a mixture of carbon tetrachloride, hydrofluoric acid and nitrogen, with a hydrofluoric acid/carbon tetrachloride molar ratio of 2.5. The contact time was 20.5 seconds and the reaction temperature was 250° C. The products of the reaction were subjected to the washing with water and soda and were then taken off in the gaseous state and analysed chromatographically. The main products of the reaction and the net yields in relation to the carbon tetrachloride and the hydrofluoric acid are shown in the following table:

| Products | Net yields in relation to HF, percent | Net yields in relation to CCl₄, percent |
|---|---|---|
| $CF_2Cl_2$ | 81.16 | 71.03 |
| $CFCl_3$ | 15.40 | 26.96 |
| $CF_3Cl$ | 3.43 | 2.00 |

There was 94% conversion of the $CCl_4$.

*Example No. 2*

A mixture of carbon tetrachloride, hydrofluoric acid and nitrogen with a $HF/CCl_4$ molar ratio of 2.84 was caused to pass over a catalyst prepared in the same way as the one used in Example No. 1.

The contact time was 12.2 seconds and the reaction temperature was 300° C.

The main reaction products and the net yields in relation to the carbon tetrachloride and the hydrofluoric acid are presented in the following table:

| Products | Net yields in relation to HF, percent | Net yields in relation to CCl₄, percent |
|---|---|---|
| $CF_2Cl_2$ | 55.6 | 65.2 |
| $CFCl_3$ | 44.2 | 34.34 |
| $CF_3Cl$ | 0.07 | 0.016 |

There was 99.1% conversion of the $CCl_4$.

*Example No. 3*

A vapor-phase mixture of trichloroethylene, chlorine, hydrofluoric acid and nitrogen, with a chlorine/trichloroethylene molar ratio of 2 and a HF/trichloroethylene molar ratio of 3.6, was passed over a catalyst prepared in the same manner as that used in Example No. 1.

The contact time was 8 seconds and the reaction temperature was 450° C. The reaction products were subjected to washing with water and soda and were then condensed at −80° C.

The condensed gases were anlysed chromatographically and were found to be composed essentially of $N_2$. A mixture of products was separated from the washing water and then distilled to separate the product from the unreacted trichloroethylene. The fraction which distilled at temperatures lower than 87° C. was joined to the condensate at −80° C.; the mixture of products contained:

Mol percent
$CF_2Cl-CF_2Cl$ _____ 44.6
$CF_2Cl-CFCl_2$ _____ 35.7
$CF_3-CH_2Cl$ _____ 2
$CF_2Cl-CCl_3$ _____ 3.6
$CCl_2=CFCl$ _____ 2.7

The net yield in relation to the hydrofluoric acid was quantitative; there was a 62% conversion.

*Example No. 4*

680 g. of active granulated alumina were impregnated with a solution containing 151 g. of $Th(NO_3)_4 \cdot 4H_2O$ and 238 g. of distilled water.

The product obtained in this manner was heated at 120° C. for 24 hours, then at 300° C. for two hours and then finally at 450° C. for a further two hours in a light current of air; it was then treated with gaseous hydrofluoric acid at a temperature within the range from 150° to 350° C. until complete saturation was reached.

Over this catalyst there was caused to pass a mixture of chloroform, hydrofluoric acid and nitrogen with a $HF/CHCl_3$ molar ratio of 2.4.

The contact time was 20.2 seconds and the reaction temperature was 250° C.

The reaction products were subjected to a light washing with water and soda and then taken off in the gaseous state and analysed chromatographically.

The main reaction products and the net yields in relation to the $CHCl_3$ and the hydrofluoric acid are presented in the following table:

| Products | Net yields in relation to HF, percent | Net yields, in relation to CHCl₃, percent |
|---|---|---|
| $CHCl_2F$ |  | 0.07 |
| $CHClF_2$ | 5 | 8 |
| $CHF_3$ | 94 | 91 |

There was 82% conversion of $CHCl_3$.

*Example No. 5*

A mixture of carbon tetrachloride, hydrofluoric acid and nitrogen with a $HF/CCl_4$ ratio of 1.8 was passed over a catalyst prepared in the same manner as that used in Example No. 4. The contact time was 10.1 seconds and the reaction temperature was 250° C. The main reaction products and the net yields in relation to the hydrofluoric acid and the carbon tetrachloride are presented in the following table:

| Products | Net yields in relation to HF, percent | Net yields in relation to CCl₄, percent |
|---|---|---|
| $CFCl_3$ | 26.5 | 42.2 |
| $CF_2Cl_2$ | 70.8 | 56.2 |
| $CF_3Cl$ | 2.6 | 1.4 |

Example No. 6

6,103 g. of $AlCl_3.6H_2O$ and 300 g. of $ThCl_4.H_2O$ dissolved in 9,000 g. of distilled $H_2O$ were treated with $NH_4OH$ until a basic reaction was obtained. The precipitate obtained was thoroughly washed with water and treated while being violently stirred with 5,260 g. of a 15% solution of HF acid. The mixture was then filtered and the residue was heated at 150° C. for 10 hours, then heated in a current of air for 2 hours at 450° C. and then finally treated at 250°–300° C. with gaseous hydrofluoric acid until complete saturation was reached.

A mixture of hydrofluoric acid, carbon tetrachloride and nitrogen with a $HF/CCl_4$ molar ratio of 1.6, was passed over this catalyst.

The contact time was 22 seconds and the reaction temperature was 250° C. The results of the test are shown in the following table:

| Products | Net yields in relation to HF, percent | Net yields in relation to CCl₄, percent |
|---|---|---|
| $CFCl_3$ | 3.7 | 7.3 |
| $CF_2Cl_2$ | 94.5 | 91.6 |
| $CF_3Cl$ | 1.7 | 1.1 |

There was 92% conversion of the HF.

Example No. 7

125 g. of $Th(NO_3)_4.4H_2O$ were dissolved in 400 cc. of water which was absorbed into 526 g. of active carbon formed into rods. The impregnated carbon was dried in an oven at 200°–300° C. and then exposed at about 200° C. to a slow current of a gaseous hydrofluoric acid until saturation was reached. Over the catalyst there was passed a mixture of trichloroethylene, hydrofluoric acid, chlorine and nitrogen at a temperature of 300° C. with a hydrofluoric acid/trichloroethylene ratio of 4.7.

The conversion in this case was not very high and the fluorinated products were as follows:

|  | Mol percent |
|---|---|
| $CF_2Cl—CF_2Cl$ | 57.6 |
| $CF_2Cl—CFCl_2$ | 25.6 |
| $CF_3—CH_2Cl$ | 16.7 |

I claim:

1. A fluorination process comprising the step of reacting a halogenated aliphatic compound selected from the group consisting of one and two carbon chlorinated alkanes and alkenes with gaseous hydrofluoric acid over a thorium fluoride catalyst at a temperature between 100 and 500° C. and with a contact time of less than 60 seconds.

2. A fluorination process according to claim 1, wherein the reaction is carried out in the presence of an inert gas.

3. A fluorination process according to claim 1, wherein the reaction is carried out in the presence of chlorine.

4. A fluorination process according to claim 1, wherein the catalyst is thorium fluoride supported on an inert material.

5. A fluorination process according to claim 1, wherein the catalyst is thorium fluoride combined with at least one compound selected from the group which consists of the fluorides of aluminum and chromium; oxyfluorides of aluminum, chromium and thorium; and oxides of aluminum, chromium and thorium.

6. A fluorination process according to claim 1, wherein said catalyst is a thorium fluoride catalyst activated by air treatment at a temperature below 600° C.

7. A fluorination process according to claim 1, wherein said catalyst is a thorium fluoride catalyst activated by air treatment at a temperature between 350° and 550° C.

8. A fluorination process according to claim 1, wherein said catalyst is a thorium fluoride catalyst activated by treatment with hydrofluoric acid at a temperature of less than 500° C.

9. A fluorination process according to claim 1, wherein said catalyst is a thorium fluoride catalyst activated by treatment with hydrofluoric acid at a temperature between 150° and 350° C.

10. A fluorination process according to claim 1, wherein said catalyst is a thorium fluoride catalyst activated by treatment with steam and air at a temperature below 800° C.

11. A fluorination process according to claim 1, wherein the catalyst has a fixed bed.

12. A fluorination process according to claim 1, wherein said catalyst has a movable bed.

13. A fluorination process according to claim 1, wherein said catalyst has a fluid bed.

14. A fluorination process comprising the step of reacting a partly halogenated aliphatic compound selected from the group consisting of one and two carbon chlorinated alkanes and alkenes with gaseous hydrofluoric acid in the presence of chlorine and an inert gas over a thorium fluoride catalyst at a temperature between 100° and 500° C. and with a contact time of less than 60 seconds.

References Cited by the Examiner

UNITED STATES PATENTS 2,005,710   6/35   Daudt et al. _____ 260—653.7

FOREIGN PATENTS 576,190   3/46   Great Britain.

LEON ZITVER, *Primary Examiner.*

ALPHONSO D. SULLIVAN, DANIEL D. HORWITZ, *Examiners.*